United States Patent
Watari et al.

(10) Patent No.: US 6,860,922 B2
(45) Date of Patent: Mar. 1, 2005

(54) HOLLOW FIBER MEMBRANE FOR THE DEGASSING OF INKS, INK DEGASSING METHOD, INK DEGASSING APPARATUS, METHOD FOR THE FABRICATION OF AN INK CARTRIDGE, AND INK

(75) Inventors: Kenji Watari, Nagoya (JP); Satoshi Takeda, Nagoya (JP); Masumi Kobayashi, Nagoya (JP); Makoto Uchida, Tokyo (JP); Masamoto Uenishi, Otake (JP); Noriaki Fukushima, Otake (JP); Seiji Hayashi, Otake (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 258 days.

(21) Appl. No.: 10/176,624

(22) Filed: Jun. 24, 2002

(65) Prior Publication Data

US 2002/0148775 A1 Oct. 17, 2002

Related U.S. Application Data

(62) Division of application No. 09/403,986, filed as application No. PCT/JP98/01965 on Apr. 30, 1998, now Pat. No. 6,447,979.

(30) Foreign Application Priority Data

Apr. 30, 1997 (JP) .............................................. 9-112561
Jan. 28, 1998 (JP) ............................................ 10-029032

(51) Int. Cl.$^7$ ........................... B01D 53/22; B01D 59/12
(52) U.S. Cl. .................. 96/6; 96/11; 96/12; 210/321.8; 210/500.23; 210/490; 106/31.43
(58) Field of Search ....................... 210/500.23, 500.27, 210/490, 321.8, 500.36; 95/45; 96/4, 11, 12, 321.8, 6, 10; 347/92; 106/31.43

(56) References Cited

U.S. PATENT DOCUMENTS

| | | | | |
|---|---|---|---|---|
| 4,713,292 A | * | 12/1987 | Takemura et al. | 428/373 |
| 4,802,942 A | * | 2/1989 | Takemura et al. | 156/244.13 |
| 5,254,143 A | * | 10/1993 | Anazawa et al. | 95/46 |
| 5,820,659 A | * | 10/1998 | Ekiner et al. | 96/8 |
| 6,270,211 B1 | * | 8/2001 | Long et al. | 347/92 |
| 6,447,679 B1 | * | 9/2002 | Watari et al. | 210/500.23 |

FOREIGN PATENT DOCUMENTS

| | | |
|---|---|---|
| EP | 0 206 354 | 12/1986 |
| JP | 62-1404 | 1/1987 |
| JP | 5-17712 | 1/1993 |
| JP | 05017712 A | 1/1993 |
| JP | 05184812 A | 7/1993 |
| JP | 5-184812 | 7/1993 |
| JP | 06335623 A | 12/1994 |
| JP | 07171555 A | 7/1995 |
| JP | 63-264127 | 11/1998 |

* cited by examiner

Primary Examiner—Ana Fortuna
(74) Attorney, Agent, or Firm—Fitch, Even, Tabin & Flannery

(57) ABSTRACT

The present invention provides a gas-permeable hollow fiber membrane having an inner diameter of 50 to 500 $\mu$m and a membrane thickness of 10 to 150 $\mu$m, which is preferably a composite hollow fiber membrane having a three-layer structure consisting of a nonporous layer having porous layers disposed on both sides thereof. Dissolved gases present in an ink can be removed by passing the ink through the bores of hollow fibers comprising such a hollow fiber membrane, and evacuating the outer surface side of the hollow fibers. This method makes it possible not only to degas inks with a slight pressure loss, but also to degas inks stably even if pressure changes occur during degassing.

3 Claims, 2 Drawing Sheets

Introduction of ink

HOLLOW FIBER MEMBRANE FOR THE DEGASSING OF INKS, INK DEGASSING METHOD, INK DEGASSING APPARATUS, METHOD FOR THE FABRICATION OF AN INK CARTRIDGE, AND INK

CROSS-REFERENCED APPLICATIONS

This application is a divisional application of U.S. application Ser. 09/403,986, filed Feb. 1, 2000 now U.S. Pat. No. 6,447,679, which is incorporated herein by reference in its entirety, and which was the 371 National phase of International Application No. PCT/JP98/01965, filed Apr. 30, 1998, which was not published in English.

TECHNICAL FIELD

This invention relates to a hollow fiber membrane for the degassing of inks which can be used to remove dissolved gases from inks for use in ink-jet printers and the like, an ink degassing method, and an ink degassing apparatus, as well as a method for the fabrication of an ink cartridge by using the same.

BACKGROUND ART

In ink-jet printers, an ink is delivered from an ink cartridge to a printer head by capillary action. However, it is known that, during delivery of the ink, minute air bubbles present in the ink or within the ink cartridge gives flow resistance to the ink. Moreover, it is also known that, when the ink head is repeatedly pressurized and depressurized during ink ejection, dissolved gases (e.g., dissolved oxygen and dissolved nitrogen) present in the ink tend to stagnate in the ink head and cause print dot losses at the time of ink ejection.

Methods for removing dissolved gases from an ink are roughly classified into physical methods for degassing an ink by physical means such as boiling or evacuation, and chemical methods for degassing an ink by introducing gas absorbents thereinto. However, physical methods are disadvantageous, for example, in that the degree of degassing is insufficient or the ink may be deteriorated. Moreover, chemical methods are also disadvantageous, for example, in that the dye contained in the ink may undergo a chemical change.

In order to solve these problems, Japanese Patent Laid-Open No. 17712/'93 discloses a method for the degassing of an ink for use in ink-jet recording which comprises passing the ink through hollow fibers comprising a gas-permeable hollow fiber membrane, and evacuating the outer surface side of the hollow fibers to remove dissolved gases from the ink by permeation through the hollow fiber membrane. The use of a hollow fiber membrane makes it possible to remove dissolved gases efficiently from an ink without exerting an adverse influence on the properties of the ink.

However, hollow fibers having an inner diameter of 20 to 30 μm are used in the ink degassing method disclosed in Japanese Patent Laid-Open No. 17712/'93. This causes a considerable pressure loss in the hollow fibers and hence requires high mechanical strength for the whole system, resulting in an increased cost. Moreover, the hollow fibers have a membrane thickness of 10 μm or less. This is disadvantageous in that, when the outer surface side of the hollow fibers is evacuated by starting a vacuum pump and returned to atmospheric pressure, the hollow fibers tend to vibrate and suffer damage as a result of mutual contact.

In order to improve their wetting properties and penetrating power into paper, inks for use in ink-jet printers usually contain a hydrophilic compound such as alcohol or ethylene glycol. Consequently, a method using a porous hollow fiber membrane can maintain high permeability to gases even if the membrane thickness is large. However, the surface of the porous base material is gradually made hydrophilic by the hydrophilic compound, so that the ink may undesirably leak out through the pores of the membrane. On the other hand, in a degassing method using a nonporous hollow fiber membrane such as one formed of teflon, the oxygen and nitrogen permeation fluxes of the teflon membrane are as low as 7.5 to 22.5×10$^{-10}$ cm$^3$/(cm$^2$·Pa·sec). Consequently, when the hollow fiber membrane has a membrane thickness ensuring adequate mechanical strength, it is difficult to obtain a sufficient gas permeability. As a result, the dissolved gas concentration in the degassed ink has been limited to as high as 6.4 ppm or so.

DISCLOSURE OF THE INVENTION

The present invention has been made in view of the above-described disadvantages, and an object thereof is to provide a hollow fiber membrane for the degassing of inks which, when used to remove dissolved gases from an ink, permits the ink to be efficiently degassed with a slight pressure loss in the ink flow path and without any damage to the hollow fiber membrane upon exposure to pressure changes, an ink degassing method, and an ink degassing apparatus.

Another object of the present invention is to provide a method for the fabrication of an ink cartridge for use in ink-jet printers wherein the dissolved gas concentrations in the ink are very low.

That is, the present invention provides a hollow fiber membrane for the degassing of inks which comprises a gas-permeable hollow fiber membrane having an inner diameter of 50 to 500 μm and a membrane thickness of 10 to 150 μm. This hollow fiber membrane for the degassing of inks preferably has a three-layer structure consisting of a nonporous layer having porous layers disposed on both sides thereof. In this case, it is preferable that the thickness of the nonporous layer be from 0.3 to 2 μm and the thickness of the porous layers be from 5 to 100 μm.

The present invention also provides an ink degassing method which comprises the steps of passing an ink through the bores of hollow fibers comprising a gas-permeable hollow fiber membrane having an inner diameter of 50 to 500 μm and a membrane thickness of 10 to 150 μm, and evacuating the outer surface side of the hollow fibers, whereby dissolved gases are removed from the ink.

Moreover, the present invention also provides an ink degassing apparatus comprising a canister having an ink inlet, an inlet side socket communicating with the ink inlet, an ink outlet, an outlet side socket communicating with the ink outlet, and a gas vent; and a hollow fiber membrane element in which follow fibers comprising a gas-permeable hollow fiber membrane having an inner diameter of 50 to 500 μm and a membrane thickness of 10 to 150 μm are fastened together with fastening members so that both ends thereof are left open, the two fastening members being connected to the inlet side socket and the outlet side socket, respectively. Preferably, this apparatus is constructed in such a way that a plurality of hollow fiber membrane elements connected in series are installed within the canister, and an ink confluence chamber is formed in each of the joints therebetween.

Moreover, the present invention also provides a method for the fabrication of an ink cartridge for use in ink-jet printers wherein, when an ink cartridge for use in ink-jet printers is filled with an ink, the ink filling flow path for conducting the ink to the ink cartridge is equipped with follow fibers comprising a gas-permeable hollow fiber membrane having an inner diameter of 50 to 500 μm and a membrane thickness of 10 to 150 μm, and the outer surface side of the hollow fibers is evacuated to remove dissolved gases from the ink, whereby the total dissolved gas concentration in the ink contained in the ink cartridge is reduced to 2,950 μg/L or less.

Furthermore, the present invention also provides an ink for use in ink-jet printers which has a total dissolved gas concentration of not greater than 2,950 mg/L.

BEST MODE FOR CARRYING OUT THE INVENTION

Figure 1:
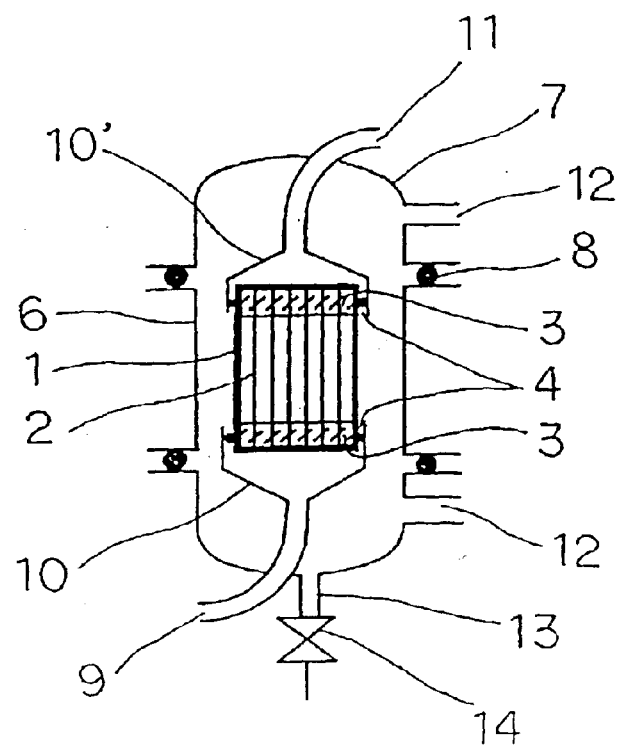
FIG. 1 is a schematic sectional view illustrating one embodiment of the ink degassing apparatus of the present invention.

The hollow fiber membrane for the degassing of inks in accordance with the present invention is a gas-permeable hollow fiber membrane having an inner diameter of 50 to 500 μm and a membrane thickness of 10 to 150 μm. The pressure loss during degassing can be minimized by using the hollow fiber membrane having an inner diameter of 50 to 500 μm. If the inner diameter is greater than 500 μm, it will be difficult to reduce the concentration of dissolved gases. Moreover, when the hollow fiber membrane having membrane thickness of 10 to 150 μm is used, variation in pressure causes no damage to the hollow fiber membrane, ensuring that the degassing of inks can be satisfactorily carried out.

The inks which can be treated with the hollow fiber membrane for the degassing of inks in accordance with the present invention are aqueous inks for use in ink-jet printers and the like. In these inks, the solvent consists essentially of water, but various water-soluble organic solvents may be added thereto. The gases to be removed are gases which have dissolved from air into inks, and typically include oxygen and nitrogen. Since the principal ingredient of such inks is water, the solubilities of gases in the inks are considered to be close to their solubilities in water. The solubilities of oxygen and nitrogen in water at 25° C. are 8.3 mg/L and 13.7 mg/L, respectively.

The hollow fiber membrane for the degassing of inks in accordance with the present invention may be a porous membrane or a nonporous membrane, provided that it has gas permeability. However, in the case of a porous membrane, the surface of the porous base material of the hollow fiber membrane is made hydrophilic by the hydrophilic compound(s) contained in the ink, so that it may be possible for the ink to leak out through the pores of the membrane. On the other hand, in the case of a nonporous membrane, the degassing of inks tends to require a long time because of its low oxygen and nitrogen permeation fluxes. For these reasons, it is preferable to use, as the hollow fiber membrane, a composite hollow fiber membrane having a three-layer structure consisting of a nonporous layer having porous layers disposed on both sides thereof. Use of such a composite hollow fiber membrane makes it possible to prevent the ink from leaking out through the hollow fiber membrane and to degas the ink with high degassing efficiency.

A preferred composite hollow fiber membrane is one in which the thickness of the nonporous layer is from 0.3 to 2 μm and the thickness of the porous layers disposed on both sides thereof is from 5 to 100 μm. Such a composite hollow fiber membrane not only has high mechanical strength and is hence less liable to damage or the like, but also exhibits good gas permeability. Moreover, when a composite hollow fiber membrane in which the porous layers have a pore size of 0.01 to 1 μm is used, the nonporous layer becomes less wettable with the ink. This makes it possible to minimize the deterioration of nonporous layer by the ink and to increase the amount of gas permeation during degassing.

These composite hollow fiber membranes having a three-layer structure may be prepared, for example, by melt-spinning a polymer for forming a homogeneous layer and a polymer for forming porous layers by means of a composite spinning nozzle of the multiple cylinder type, and then drawing the spun hollow fiber under conditions which permit the parts forming the porous layers to be made porous without making the homogeneous layer porous.

The polymer materials which can be used to form the nonporous layer of these composite hollow fiber membranes include, in addition to silicone rubber type polymers having high gas permeability, silicone rubber type polymers such as polydimethylsiloxane and silicone-polycarbonate copolymers; polyolefin type polymers such as poly(4-methylpentene-1) and low-density polyethylene; fluorine-containing polymers such as perfluoroalkyl-containing polymers; cellulose type polymers such as ethyl cellulose; polyphenylene oxide; poly(4-vinylpyridine); and urethane polymers. These polymers may be used alone or in the form of a copolymer or a polymer blend.

The polymer materials which can be used to form the porous layers include polyolefin polymers such as polyethylene, polypropylene, poly(3-methylbutene-1) and poly(4-methylpentene-1); fluorine-containing polymers such as polyvinylidene fluoride and polytetrafluoroethylene; polystyrene; polyether-ether-ketones; polyether-ketones; and the like.

No particular limitation is placed on the combination of the polymer material forming the nonporous layer and the polymer material forming the porous layers. Not only different types of polymers, but also the same type of polymers may be used.

As the material of the nonporous layer, urethane polymers are preferred because of their high gas permeability and high stability in film formation. As the material of the porous layers, polyethylene is preferred because it can yield a highly flexible hollow fiber membrane and it has high stability in film formation. Polypropylene has high durability to chemical solutions, relatively high mechanical strength, and better thermal properties than polyethylene and urethanes, so that it is a more preferred material for both the nonporous layer and the porous layers. Polyolefin type polymers are excellent in that, when used for the nonporous layer, they are scarcely deteriorated by chemical solutions. Moreover, when used for the porous layers, they have high durability to chemical solutions and high mechanical strength, so that they exhibit excellent workability in the fabrication of hollow fiber membrane elements.

Now, the ink degassing method and ink degassing apparatus of the present invention are described hereinbelow with reference to the accompanying drawings.

FIG. 1 is a schematic sectional view illustrating an example of the ink degassing apparatus of the present invention. A hollow fiber membrane element is installed within a canister consisting of a canister body 6 and canister caps 7 disposed at the top and bottom thereof. Canister caps 7 are hermetically sealed to canister body 6 by means of gaskets 8.

Figure 2:
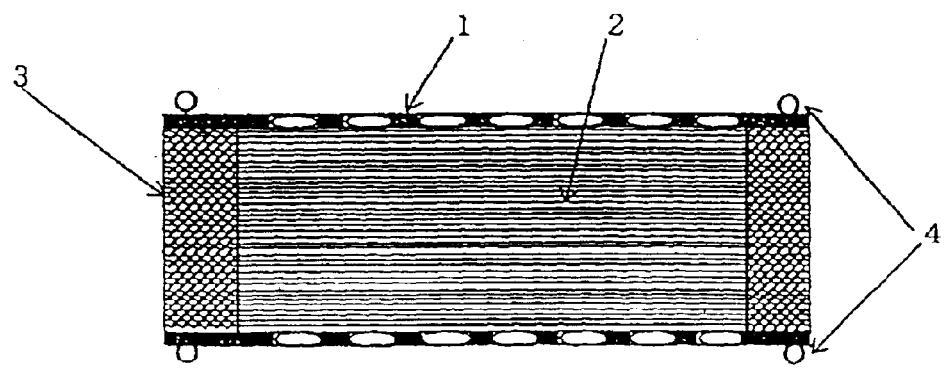
FIG. 2 is a schematic sectional view illustrating an exemplary hollow fiber membrane element for use in the ink degassing apparatus of the present invention.

FIG. 2 is a schematic sectional view illustrating the construction of the hollow fiber membrane element. A large number of hollow fibers 2 comprising a gas-permeable hollow fiber membrane having an inner diameter of 50 to 500 $\mu$m and a membrane thickness of 10 to 150 $\mu$m are arranged within a perforated cylindrical case 1 having a multitude of openings or interstices in the wall thereof. At both ends of perforated cylindrical case 1, these hollow fibers 2 are bundled and fastened together with fastening members 3 so that the ends of the hollow fibers are left open. Moreover, O-rings 4 for connecting purposes are mounted on the outer periphery of perforated cylindrical case 1 at two positions near both ends thereof.

The material of perforated cylindrical case 1 should be one which has adequate mechanical strength and good durability to inks. The materials which can be used for this purpose include, for example, rigid polyvinyl chloride resin, polycarbonates, polysulfone resins, polyolefin resins (e.g., polypropylene), acrylic resins, ABS resin and modified PPO resins. For hollow fibers 2, the above-described hollow fiber membrane for the degassing of inks is used.

Fastening members 3 function as members for fastening the large number of hollow fibers with both ends thereof left open and for parting the ink flow path airtightly from the evacuated gas flow path. As fastening members 3, there may be used members formed by curing a liquid resin selected from epoxy resins, unsaturated polyester resins and polyurethane resins, and members formed by melting a polyolefin or the like and solidifying it by cooling.

No particular limitation is placed on the form of the hollow fiber membrane element, provided that it has a construction in which both ends of hollow fibers are bundled and fastened together with fastening members and, moreover, drain can be easily removed. However, a hollow fiber membrane element assembled within a perforated cylindrical case is preferred because this prevents the hollow fibers from being damaged during fabrication of the hollow fiber membrane element and this permits the hollow fiber membrane element to be fabricated with high dimensional accuracy.

One of the fastening members of the hollow fiber membrane element is connected to an outlet side socket 10' installed in the upper canister cap 7 so as to communicate with an ink outlet 11. The other fastening member is connected to an inlet side socket 10 installed in the lower canister cap 7 so as to communicate with an ink inlet 11.

Canister caps 7 connected to the upper and lower ends of canister body 6 are provided with exhaust vents 12 which are connected to a vacuum pump or the like in order to evacuate the canister. By evacuating the canister, dissolved gases are removed from the ink through the hollow fiber membrane. It is to be understood that these exhaust vents may be provided on canister body 6.

An ink is fed through an ink inlet 9, introduced into the hollow fiber membrane element by way of inlet side socket 10, and subjected to a degassing treatment through the membrane of the hollow fibers while flowing through the bores of the hollow fibers. The degassed ink is discharged from ink outlet 11. The degree of vacuum employed for the degassing treatment is preferably not greater than 10 KPa. The degassing treatment is preferably carried out to such an extent that the total dissolved gas concentration in the ink is reduced to 2,950 ppb or less, through it may vary according to the flow rate of the ink being treated, and the oxygen and nitrogen permeabilities of the hollow fiber membrane. As used herein, the term "total dissolved gas concentration" means the sum of the dissolved oxygen concentration and the dissolved nitrogen concentration.

Lower canister cap 7 is provided with a drain pipe 13 having a cock 14 and serving to remove any condensate from the canister as required. Thus, any drain liquid resulting from the condensation of water vapor and other vapors having evaporated from the ink through the hollow fiber membrane can be easily discharged out of the canister.

Figure 3:
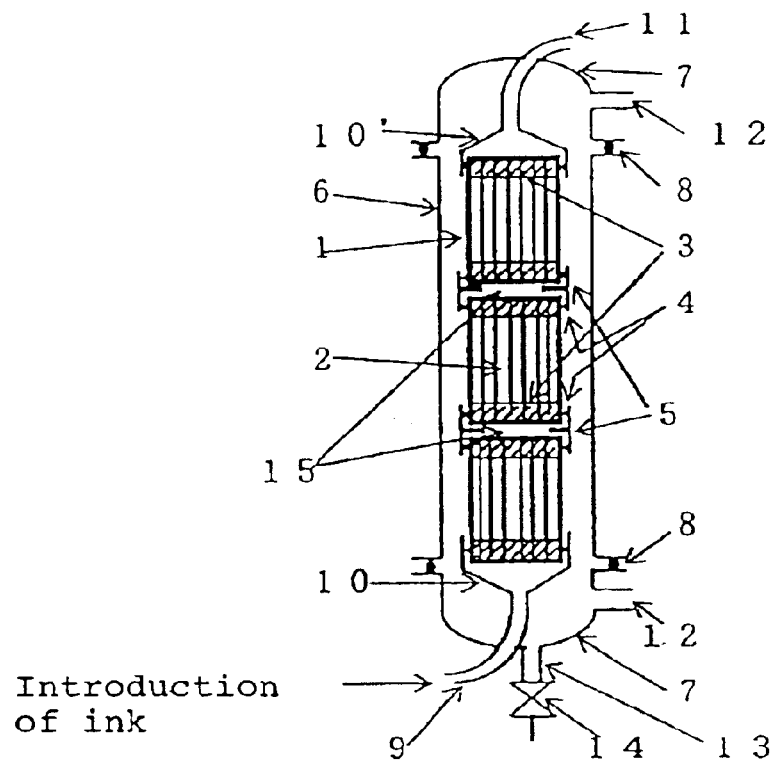
FIG. 3 is a schematic sectional view illustrating another embodiment of the ink degassing apparatus of the present invention.

FIG. 3 is a schematic sectional view illustrating another embodiment of the ink degassing apparatus of the present invention. In this embodiment, there is used a hollow fiber membrane module formed by connecting a plurality of hollow fiber membrane elements in series. One of the free fastening members of the hollow fiber membrane module is connected to an inlet side socket 10 communicating with an ink inlet 9, and the other free fastening member is connected to an outlet side socket 10' communicating with an ink outlet 11.

Figure 4:
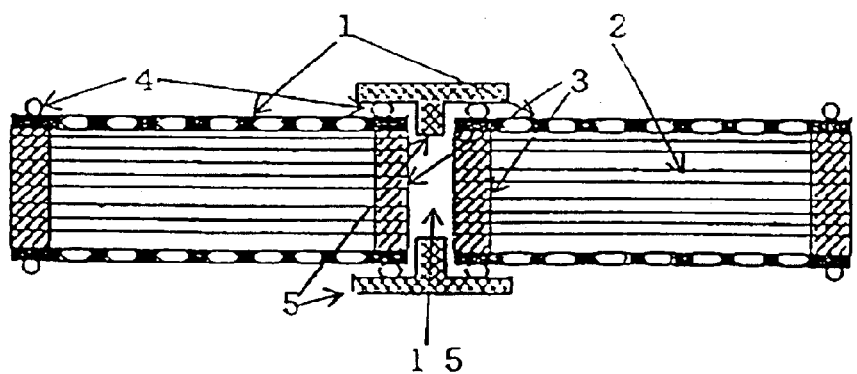
FIG. 4 is a schematic sectional view illustrating an exemplary hollow fiber membrane module for use in the ink degassing apparatus of the present invention.

FIG. 4 is a schematic sectional view illustrating a joint between adjacent hollow fiber membrane elements. Hollow fiber membrane elements are connected in series by means of connectors 5, and a ink confluence chamber 15 is formed in each joint. Connectors 5 may be may be made of a material which has adequate mechanical strength and good durability to inks. The materials suitable for this purpose include, for example, rigid polyvinyl chloride resin, polycarbonates, polysulfone resins, polyolefin resins (e.g., polypropylene), acrylic resins, ABS resin and modified PPO resins, and metals (e.g., stainless steel).

An ink is fed through an ink inlet 9, introduced into the hollow fiber membrane module installed within the canister, and subjected to a degassing treatment through the membrane of the hollow fibers while flowing through the bores of the hollow fibers. The ink having passed through the hollow fibers of one hollow fiber membrane element is temporarily combined together in an ink confluence chamber 15 formed between adjacent hollow fiber membrane elements, so that the ink is fed to the succeeding hollow fiber membrane element after the dissolved gas concentration in the ink is made uniform. Consequently, as compared with the case in which hollow fiber membrane elements having no ink confluence chamber are used, the degassing efficiency per unit membrane area is improved. This makes it possible to degas an ink at a higher flow rate of the ink being treated.

Since the hollow fiber membrane elements are connected by means of connectors 5 and are hence easy to assemble and dissemble, they can readily be replaced. Moreover, the optimum design can readily be achieved by varying the length of the module or the elements and the number of connectors according to the length of the canister. Furthermore, when a plurality of hollow fiber membrane elements are connected, in addition to the embodiment in which they are connected in series as illustrated in FIG. 3, it is also possible to connect the hollow fiber membrane elements in parallel while using the corresponding number of inlet side sockets and outlet side sockets.

Although the achievable degree of degassing in the ink treated by the method of the present invention may vary according to the flow rate of the ink being treated and the gas permeability of the hollow fiber membrane used, it is preferable to degas the ink until the total dissolved gas concentration in the ink is not greater than 2,950 μg/L. When the total dissolved gas concentration in the ink is not greater than 2,950 μg/L, the frequency of print dot losses in ink-jet recording is reduced to 0.5% or less, resulting in a practically satisfactory high-quality print or image. As used herein, the term "frequency of print dot losses" means the ratio of the number of unprinted dots to the total number of print dots.

In order to reduce the total dissolved gas concentration in the ink to 2,950 μg/L or less, it is preferable to use a composite hollow fiber membrane having an oxygen permeation flux of not less than $7.5 \times 10^{-9}$ cm$^3$/(cm$^2$·Pa·sec) and a nitrogen permeation flux of not less than $0.75 \times 10^{-9}$ cm$^3$/(cm$^2$·Pa·sec), provided that the flow rate of the ink being treated is 1 L/min·m$^2$ (membrane area).

When an ink cartridge for use in ink-jet printers is fabricated by utilizing the above-described ink degassing method and ink degassing apparatus of the present invention, the ink filling flow path for conducting an ink to the ink cartridge is equipped with the above-described ink degassing apparatus, and the outer surface side of the hollow fibers is evacuated to remove dissolved gases from the ink, whereby the total dissolved gas concentration in the ink contained in the ink cartridge is reduced to 2,950 μg/L or less. Thus, ink cartridges for use in ink-jet printers can be fabricated.

When the ink cartridge is filled with the ink having a total dissolved gas concentration of not greater than 2,950 ppb, it is especially preferable to evacuate the ink cartridge and then fill it with the ink. If the ink is fed under pressure without evacuating the ink cartridge, there is a possibility that the pressurizing gas or contaminant gases may be dissolved into the once degassed ink during pressure feeding and, therefore, the present invention may fail to produce its desired effect.

The present invention is further illustrated by the following examples. In these examples, the dissolved oxygen concentration in an ink was measured with an MOCA 3600 Series O$_2$ Analyzer (manufactured by Orbis Fair Laboratories), and the dissolved nitrogen concentration therein was measured with an MOCA 3610 Series N$_2$ Analyzer (manufactured by Orbis Fair Laboratories).

EXAMPLE 1

A composite hollow fiber membrane having an inner diameter of 200 μm and a membrane thickness of 40 μm and consisting of a nonporous layer formed of a segmented polyurethane [Tecoflex EG80A (trade name), manufactured by Thermedix Co., Ltd.; MRF=15; density=1.04] and porous layers formed of high-density polyethylene [Hizex 2200J (trade name), manufactured by Mitsui Chemical Co., Ltd.; MRF=5.2; density=0.968] and disposed on both sides of the nonporous layer was provided. The thickness of the nonporous layer was 0.8 μm and the pore diameter of the porous layer was 0.1 μm. This composite hollow fiber membrane had an oxygen permeation flux of $7.7 \times 10^{-9}$ cm$^3$/(cm$^2$·Pa·sec) and a nitrogen permeation flux of $3.0 \times 10^{-9}$ cm$^3$/(cm$^2$·Pa·sec). In a perforated cylindrical case made of a modified PPO resin, a large number of hollow fibers comprising this hollow fiber membrane were bundled and fastened together with fastening members comprising an epoxy resin so that both ends of the hollow fibers were left open. Thus, a hollow fiber membrane element as illustrated in FIG. 2 was fabricated. This hollow fiber membrane element had an effective hollow fiber length of 20 cm and a membrane area of 2.4 m$^2$.

One such hollow fiber membrane element was installed in a canister as illustrated in FIG. 1. Then, an ink for use in ink-jet printers was degassed by passing it through the hollow fiber membrane element at 25° C. and at a flow rate of 1 L/min and evacuating the outside of the hollow fibers to a pressure of 3 KPa.

Before the degassing treatment, the dissolved gas concentrations in the ink were 14.1 mg/L for nitrogen and 8.2 mg/L for oxygen. As a result of this treatment, the dissolved nitrogen and oxygen concentrations were reduced to 2,400 μg/L and 400 μg/L, respectively.

EXAMPLE 2

A hollow fiber membrane element having the same construction as that of Example 1, except that the effective hollow fiber length was 60 cm, was fabricated. This hollow fiber membrane element was installed in a canister and used to degas an ink under the same conditions as in Example 1.

Before the degassing treatment, the dissolved gas concentrations in the ink were 13.9 mg/L for nitrogen and 8.3 mg/L for oxygen. As a result of this treatment, the dissolved nitrogen and oxygen concentrations were reduced to 2,330 μg/L and 280 μg/L, respectively.

EXAMPLE 3

Three hollow fiber membrane elements similar to that fabricated in Example 1 were connected in series by means of connectors as illustrated in FIG. 4. The connected hollow fiber membrane elements were installed in a canister as illustrated in FIG. 3, and used to degas an ink under the same conditions as in Example 1.

Before the degassing treatment, the dissolved gas concentrations in the ink were 14.1 mg/L for nitrogen and 8.2 mg/L for oxygen. As a result of this treatment, the dissolved nitrogen and oxygen concentrations were reduced to 1,800 μg/L and 95 μg/L, respectively.

EXAMPLE 4

A composite hollow fiber membrane having an inner diameter of 180 μm and a membrane thickness of 35 μm and consisting of a nonporous layer formed of a propylene polymer [Toughmer XR106L (trade name), manufactured by Mitsui Chemical Co., Ltd.; MRF=8; density=0.89] and porous layers formed of polypropylene [J-115G, manufactured by Ube Industries Ltd.; MRF=15; density=0.89] and disposed on both sides of the nonporous layer was provided. The thickness of the nonporous layer was 0.6 μm and the pore diameter of the porous layer was 0.1 μm. This composite hollow fiber membrane had an oxygen permeation flux of $7.6 \times 10^{-9}$ cm$^3$/(cm$^2$·Pa·sec) and a nitrogen permeation flux of $2.4 \times 10^{-9}$ cm$^3$/(cm$^2$·Pa·sec). Using hollow fibers comprising this composite hollow fiber membrane, three hollow fiber membrane elements having the same construction as that of Example 1 were fabricated. In the same manner as in Example 3, these three hollow fiber membrane elements were connected in series by means of connectors. The connected hollow fiber membrane elements were installed in a canister and used to degas an ink under the same conditions as in Example 1.

Before the degassing treatment, the dissolved gas concentrations in the ink were 14.0 mg/L for nitrogen and 8.1 mg/L for oxygen. As a result of the above-described degassing treatment, the dissolved nitrogen and oxygen concentrations were reduced to 1,950 μg/L and 120 μg/L, respectively.

EXAMPLE 5

A composite hollow fiber membrane having an inner diameter of 195 μm and a membrane thickness of 35 μm and consisting of a nonporous layer formed of poly(4methylpentene-1) [TPX-MX002 (trade name), manufactured by Mitsui Chemical Co., Ltd.; MRF=22; density=0.835] and porous layers formed of poly(4-methylpentene-1) [TPX-RT31 (trade name), manufactured by Mitsui Chemical Co., Ltd.; MRF=26; density=0.833] and disposed on both sides of the nonporous layer was provided. The thickness of the nonporous layer was 0.6 μm and the pore diameter of the porous layer was 0.03 μm. This composite hollow fiber membrane had an oxygen permeation flux of $31 \times 10^{-9}$ cm$^3$/(cm$^2$·Pa·sec) and a nitrogen permeation flux of $7.8 \times 10^{-9}$ cm$^3$/(cm$^2$·Pa·sec). Using hollow fibers comprising this composite hollow fiber membrane, three hollow fiber membrane elements having the same construction as that of Example 1 were fabricated.

In the same manner as in Example 3, these three hollow fiber membrane elements were connected in series by means of connectors. The connected hollow fiber membrane elements were installed in a canister and used to degas an ink under the same conditions as in Example 1.

Before the degassing treatment, the dissolved gas concentrations in the ink were 14.0 mg/L for nitrogen and 8.2 mg/L for oxygen. As a result of the above-described degassing treatment, the dissolved nitrogen and oxygen concentrations were reduced to 1,050 μg/L and 60 μg/L, respectively.

The ink degassing method and ink degassing apparatus of the present invention make it possible not only to degas inks with a slight pressure loss, but also to degas inks stably without any damage to the hollow fiber membrane even if pressure changes occur during degassing.

What is claimed is:

1. An ink degassing apparatus comprising a canister having an ink inlet, and inlet side socket communicating with the ink inlet, an ink outlet, an outlet side socket communicating with the ink outlet, and a gas vent; and a hollow fiber membrane element in which hollow fibers comprising a gas-permeble hollow fiber membrane having an inner diameter of 50 to 500 μm and a membrane thickness of 10 to 150 μm are fastened together with fastening members so that both ends thereof are left open, the two fastening members being connected to the inlet side socket and the outlet side socket, respectively.

2. An ink degassing apparatus as claimed in claim 1 wherein a plurality of hollow fiber membrane elements connected in series are installed within the canister, and an ink confluence chamber is formed in each of the joints therebetween.

3. An ink degassing apparatus as claimed in claim 1 or 2 wherein the hollow fiber membrane is a composite hollow fiber membrane having a three-layer structure consisting of a nonporous layer having porous layers disposed on both sides thereof.

* * * * *